United States Patent
Batchilo et al.

(10) Patent No.: US 7,251,781 B2
(45) Date of Patent: Jul. 31, 2007

(54) COMPUTER BASED SUMMARIZATION OF NATURAL LANGUAGE DOCUMENTS

(75) Inventors: Leonid Batchilo, Belmont, MA (US); Valery Tsourikov, Boston, MA (US); Igor Sovpel, Minsk (BY)

(73) Assignee: Invention Machine Corporation, Boston, MA (US)

( * ) Notice: Subject to any disclaimer, the term of this patent is extended or adjusted under 35 U.S.C. 154(b) by 461 days.

(21) Appl. No.: 10/208,941

(22) Filed: Jul. 31, 2002

(65) Prior Publication Data

US 2003/0130837 A1 Jul. 10, 2003

Related U.S. Application Data

(60) Provisional application No. 60/308,886, filed on Jul. 31, 2001.

(51) Int. Cl.
*G06F 17/00* (2006.01)

(52) U.S. Cl. .......................... 715/531; 704/9
(58) Field of Classification Search ................ 715/531, 715/530, 511; 704/9
See application file for complete search history.

(56) References Cited

U.S. PATENT DOCUMENTS

| | | | |
|---|---|---|---|
| 5,418,889 A | 5/1995 | Ito | |
| 5,638,543 A | 6/1997 | Pedersen et al. | |
| 5,696,916 A | 12/1997 | Yamazaki et al. | |
| 5,708,825 A * | 1/1998 | Sotomayor | 715/501.1 |
| 5,748,973 A | 5/1998 | Palmer et al. | |
| 5,774,845 A * | 6/1998 | Ando et al. | 704/231 |
| 5,924,108 A | 7/1999 | Fein et al. | |
| 5,978,820 A | 11/1999 | Mase et al. | |
| 6,026,388 A | 2/2000 | Liddy et al. | |
| 6,128,634 A | 10/2000 | Golovchinsky et al. | |
| 6,167,370 A | 12/2000 | Tsourikov et al. | |
| 6,185,592 B1 | 2/2001 | Boguraev et al. | |
| 6,205,456 B1 * | 3/2001 | Nakao | 715/531 |
| 6,212,494 B1 | 4/2001 | Boguraev | |
| 6,246,977 B1 | 6/2001 | Messerly et al. | |
| 6,263,335 B1 | 7/2001 | Paik et al. | |

(Continued)

OTHER PUBLICATIONS

Goldstein et al., "Summarizing Text Documents: Sentence Selection and Evaluation Metrics", Proceedings of the 22nd annual international ACM SIGIR conference on Research and development in information retrieval, 1999, pp. 121-128.*

(Continued)

*Primary Examiner*—Doug Hutton
*Assistant Examiner*—Amelia Rutledge
(74) *Attorney, Agent, or Firm*—Miles & Onello, LLP

(57) ABSTRACT

A system and method for summarizing the contents of a natural language document provided in electronic or digital form includes preformatting the document, performing linguistic analysis, weighting each sentence in the document as a function of quantitative importance, and generating one or more document summaries, from a plurality of selectable document summary types, as a function of the sentence weights.

34 Claims, 13 Drawing Sheets

U.S. PATENT DOCUMENTS

| | | | |
|---|---|---|---|
| 6,317,708 B1 * | 11/2001 | Witbrock et al. | 704/9 |
| 6,338,034 B1 * | 1/2002 | Ishikawa et al. | 704/9 |
| 6,349,316 B2 * | 2/2002 | Fein et al. | 715/531 |
| 6,374,209 B1 * | 4/2002 | Yoshimi et al. | 704/9 |
| 6,401,086 B1 * | 6/2002 | Bruckner | 707/4 |
| 6,424,362 B1 * | 7/2002 | Bornstein et al. | 715/854 |
| 6,537,325 B1 * | 3/2003 | Nishizawa | 715/530 |
| 6,754,654 B1 | 6/2004 | Kim et al. | |
| 6,789,230 B2 * | 9/2004 | Katariya et al. | 715/531 |
| 6,823,325 B1 | 11/2004 | Davies et al. | |
| 6,823,331 B1 * | 11/2004 | Abu-Hakima | 707/3 |
| 6,871,199 B1 | 3/2005 | Binnig et al. | |

OTHER PUBLICATIONS

Kupiec et al., A Training Document Summarizer, ACM Press Proceeding of the 18th Annual International ACM SIGIR Conference on Research and Development in Information Retrieval, pp. 68-73, 1995.

* cited by examiner

| | |
|---|---|
| JJ | adjective |
| JJB | adjective, attributive-only |
| JJed | past participle in attributive function in pre-position |
| JJing | present participle in attributive function in pre-position |
| JJR | adjective, comparative degree |
| JJT | adjective, superlative degree |
| JNP | capitalized adjective |
| NN | common noun singular |
| NNP | capitalized common noun singular |
| NNPS | capitalized common noun plural |
| NNS | common noun plural |
| NNU | abbreviaton of units of measure without a specific number |
| NNUS | abbreviation of units of measure, plural |
| NP | proper noun singular |
| NPL | capitalized locative noun singular |
| NPLS | capitalized locative noun plural |
| NPS | proper noun plural |
| NPT | capitalized proper noun singular denoting title or rank |
| NPTS | capitalized proper noun plural denoting title or rank |
| NR | adverbial noun singular |
| NRS | adverbial noun plural |
| RB | adverb |
| RBR | adverb, comparative degree |
| RBT | adverb, superlative degree |
| RI | adverb, omograph of preposition |
| RN | nominal adverb |
| RP | postposition (adverbial particle) |
| VB | infinitive or verb in its present simple tense form except 3d person singular |
| VBD | verb simple past tense form |
| VBG | present participle |
| VBN | past participle |
| VBZ | verb in its simple present 3d person singular tense form |

FIG. 7.

- drill
- coil
- toroidal coil
- said toroidal coil antenna
- electrodes or coil
- formation
- toroidal coil antenna
- communication
- said first subassembly
- earth formation
- drill collar
- toroidal antenna
- signal
- earth
- said measurement signal
- said surface communication signal
- electrode
- receiving toroidal coil
- toroidal coil transmitter coil

FIG. 9

```
⊟ T SUBASSEMBLY
    ─ T TWO PARTS OF SUBASSEMBLY
    ─ T ROTATIONAL AZIMUTH OF SUBASSEMBLY
    ⊟ T RELATIVE PLACEMENTS OF SUBASSEMBLIES
        ─ T RELATIVE PLACEMENTS OF PARTICULAR MEASUREMENT SUBASSEMBLY
    ⊟ T BOTTOM HOLE SUBASSEMBLIES
        ─ T SUBASSEMBLY OF BOTTOM HOLE ASSEMBLY
    ─ T ENTIRE SUBASSEMBLY
    ⊟ T MUD TELEMETRY SUBASSEMBLY
        ─ T DOWNHOLE MUD TELEMETRY SUBASSEMBLY
    ─ T MAIN COMMUNICATIONS SUBASSEMBLY
    ⊟ T SURFACE/LOCAL COMMUNICATIONS SUBASSEMBLY
        ─ T DIAGRAM OF SURFACE/LOCAL COMMUNICATIONS SUBASSEMBLY OF FIG.
        ─ T EMBODIMENT OF SURFACE/LOCAL COMMUNICATION SUBASSEMBLY OF FIG. EMBODIMENT
    ─ T SAID FIRST SUBASSEMBLY
    ─ T SURFACE COMMUNICATIONS SUBASSEMBLY
    ─ T MEASUREMENT SUBASSEMBLY
⊟ T COIL
    ─ T ASSEMBLED COIL
    ─ T COIL PASS
    ─ T ELECTRODES OR COILS
    ─ T RECEIVER COIL
    ─ T TRANSMITTER COIL
    ⊟ T TOROIDAL COIL
        ─ T SMALL TOROIDAL COIL
        ─ T TOROIDAL COIL TRANSMITTING
        ⊟ T RECEIVER TOROIDAL COIL
            ─ T OUTPUT OF RECEIVER TOROIDAL COIL
            ─ T LOWER RECEIVER TOROIDAL COIL
        ⊟ T TRANSMITTING TOROIDAL COIL
            ─ T PAIR OF SPACED-APART TRANSMITTING TOROIDAL COILS
            ─ T TRANSMITTING TOROIDAL COIL OF FIG.
        ⊟ T TRANSMITTER TOROIDAL COIL
```

FIG. 10

| | | |
|---|---|---|
| | well | logging apparatus |
| | send | information |
| | determine | earth formation resistivity |
| wireline logging | employ | technique |
| apparatus | determine | resistivity of formation |
| | surround | earth borehole |
| | receive | toroidal coil |
| | transmit | toroidal coil |
| | obtain | measurement |
| | obtain | resistivity measurement |
| | devise | equipment |
| | provide | resistivity measurement information |
| | provide | Improvement |
| system | include | second subassembly |
| | receive | local communication signal |
| | generate | surface communication signal |
| invention | utilize | toroidal coil antenna |
| | induce | current |
| path | include | drill collar and earth formation |
| | mount | toroidal coil antenna |
| electrode | detect | current |
| | provide | electrode |
| transmitter toroidal coil | transmit | current |
| electrode | provide | azimuthal resistivity measurement |
| electrode | span | small fraction of total circumferential locus of borehole |

FIG. 11

The knowledge is essential to improve climate forecasts.

The particles also can have an indirect cooling effect on climate by acting as seeds for cloud condensation and, increasing the reflectivity, or albedo, of clouds.

With Asia's population rising at a dramatic rate, the amount of sulfur dioxide released is expected to increase.

FIG. 12

Application :
The invention relates to the field of well logging and, more particularly, to well logging apparatus for determining earth formation resistivity and sending the information to the earth's surface.

Techniques employed in wireline logging may or may not be adaptable for use in a measurement-while-drilling equipment.

In accordance with an embodiment of the invention, an apparatus is disclosed for determining the resistivity of formations surrounding an earth borehole.

Task :
Resistivity measurements obtained using transmitting and receiving toroidal coils on a conductive metal body are useful, particularly in logging-while-drilling applications, but it would be desirable to obtain measurements which can provide further information concerning the downhole formations; lateral resistivity information having improved vertical resolution, azimuthal resistivity information, and multiple depths of investigation for such resistivity information.

It is among the objects of the present invention to devise equipment which can provide such further resistivity measurement information.

It is among the further objects of the present invention to provide improvement in the efficiency and flexibility of communications in logging-while-drilling systems.

Method :
The system further includes a second subassembly near the drill bit which includes a second conducting body with a second toroidal coil antenna mounted on it and means to receive the local communication signal through the second toroidal coil and means to generate a surface communication signal from the local communication signal and transmit it through an acoustic transmitter to the surface, where it is received by an acoustic receiver.

A form of the present invention utilizes a toroidal coil antenna mounted, in an insulating medium, on a drill collar to induce a current which travels in a path that includes the drill collar and earth formations around the drill collar.

In accordance with a feature of the present invention, at least one electrode is provided on the drill collar and is utilized to detect currents transmitted by the transmitter toroidal coil which return via the formations to the electrode(s) laterally; approximately normal to the axis of the drill collar.

Features :
The electrodes can also provide azimuthal resistivity information.

The electrodes span only a small fraction of the total circumferential locus of the borehole and provide azimuthal resistivity measurements.

In the illustrated embodiment, the surfaces of electrodes 226, 227 and 228 have diameters of about 1 inch, which is large enough to provide sufficient signal, and small enough to provide the desired vertical and azimuthal measurement resolution.

FIG. 13

COMPUTER BASED SUMMARIZATION OF NATURAL LANGUAGE DOCUMENTS

CROSS REFERENCES TO RELATED APPLICATIONS

This application claims the benefit of priority under 35 U.S.C. §119(e) from co-pending, commonly owned U.S. provisional patent application Ser. No. 60/308,886, entitled COMPUTER BASED SUMMARIZATION OF NATURAL LANGUAGE DOCUMENTS, filed Jul. 31, 2001.

FIELD OF THE INVENTION

This invention relates to systems and methods of automatically summarizing the contents of natural language documents stored in electronic or digital form.

BACKGROUND

There are several known approaches of solving the problem of automatic summarization of stored electronic documents. These approaches include (1) the use of different kinds of statistics gathered from the text, (2) information extraction, based on a word's position in the text or based on a document design, (3) search of "cue words" as marks for text of importance and desired for representation in the summary, and (4) usage of discursive text analysis to define elements, which represent the center of a document subtopic discussion.

These methods were modified as the means of linguistic text analysis evolved. At the earliest stages, these forms of analysis only allowed one to divide text into words and sentences and to conduct elementary morphological words analysis. Commonly, the summary was made up from the sentences of initial text that received the highest rank, or that met some other criteria. The statistics, in such cases, were collected on text word usage rate. That is, the more the word was found in the text, the weightier it was considered. Auxiliary words and other words considered not to be significant were filtered out according to a set of predetermined lists.

Alternatively, so called "tf*idf" word estimation was used, where the distribution of a word in a document set was taken into consideration. Such estimation is discussed in U.S. Pat. No. 6, 128,634 to Golovchinsky, et al., for highlighting significant terms for the purpose of making a quick review of the document relatively easy.

A similar approach is used in U.S. Pat. No. 5, 924,108 to Fein, et al., where the estimation of a sentence is made as the arithmetic mean of word estimation. The method of "cue words" in this patent relies on the presence of certain words or their combinations in the sentence. In U.S. Pat. No. 5,638,543 to Peterson, et al. a method is described to extract single sentences.

There are some systems that use different combinations of the aforementioned approaches. For example, U.S. Pat. No. 5, 978, 820 to Mase, et al. defines a document's type with the help of different statistic values, such as the average number of words and symbols in a sentence, the average number of sentences in the paragraph, and so on. Then, the topic of the document is defined on the basis of the specific word usage. A summary is compiled as the totality of sentences, which are included in the original document or those that have certain predetermined words.

In Kupiec, et al., "A Training Document Summarizer", ACM Press Proceeding of the 18th Annual International ACM SIGIR Conference on Research and Development in Information Retrieval, 1995, pp. 68–73, the probability of a sentence being included in the summary is computed on the basis of such characteristics as sentence length, presence of certain words, sentence position, presence or frequency words and proper names.

However, in all of these prior works, only shallow text analysis is carried out, which cannot produce high accuracy. All of these prior methods fail to determine the significance of information content. The use of more advanced means of text analysis, such as tagging, advance the work of these methods due to more exact significant word determination, usage of lemmas in the calculations of statistics, and the search of patterns. Nevertheless, these improvements are limited and do not offer efficiency.

The next stage in the development of means of linguistic text analysis using some measure of abstracting is the appearance of systems that mark out syntactic structures, such as noun phrases, surface subjects, actions and objects in the sentences, but for very limited purposes. That is, as implemented, it is possible to make the simplest semantic text analysis to reveal deep text objects and relations between them. For example, results of deep text analysis is used in U.S. Pat. No. 6,185,592 to Boguraev, et al., where, for text segments, the most significant noun phrase groups are marked on the basis of their usage frequency in weighted semantic roles. A resulting document summary report presents the number of these noun phrases and their context.

Thus, a limited attempt has been made to build a summary report on the basis of automatically extracted knowledge from a text document at the object level. However, determining deep semantic relations between the objects themselves, in particular knowledge on the level of facts and also the main functional relations between the facts themselves, has not been considered.

SUMMARY OF THE INVENTION

The inventive concepts alleviate the above noted problems in generating a document summary by performing deep linguistic analysis on text within a document. A plurality of methods of text analysis are performed by a system and method in accordance with the present invention to generate the document summary. For example, such methods may include one or more of statistical analysis, positional analysis and the method of using "cue words". However, in accordance with the present invention, such methods are modified and provided for creating the document summary using deep linguistic text analyses.

Document summary generation is based on the semantic relations described in the document, rather than on significant words or syntactic structures. In the inventive approach, analysis is based on an understanding at the level of objects, facts, and regularities of the knowledge domain to which the document refers. Such a complex approach provides high precision.

Preferably, in accordance with the present invention, a user is provided with a wide range of selectable summary outputs, which can be especially important if working with a large number of documents and with relatively large documents. That is, the present invention may be configured to provide the ability to obtain different types of summaries of a document, based on preformatting and linguistic, statistical and empirical analysis that is performed on the document during processing.

Preformatting the document includes detecting the documents special fields (if any). For example, given a certain type of document, it may be known that certain fields will exist. For instance it may be known that if the document is an article, the article will have a title field. Preformatting may also include error detection and correction, wherein errors such as mismatches and misspellings are found by an error correction and detection module. Document to word splitting is performed and then document to sentence splitting is performed, wherein the document is broken into smaller units for analysis. A preformatted document is produced and then used in linguistic analysis.

Linguistic analysis includes part-of-speech tagging, parsing and semantic analysis. Semantic analysis includes extraction of knowledge bits, corresponding to objects, facts and rules of the knowledge domain. Objects proper and their object attributes are differentiated. Facts can include a subject, action, or object (SAO). Rules are applied to determine cause-effect relationships. The rules may be accessed from a linguistic knowledge base having cause-effect models stored therein. The linguistic knowledge base may include a database of dictionaries, classifiers, statistical data, and so on, a database for linguistic models recognition (e.g., for text-to-word splitting, recognizing of subject, object, action, attributes, and so on) and a database for empiric model recognition (e.g., for preformatting of the document and its empirical evaluation).

The linguistic analysis outputs a functionally analyzed document with attributes for subject, action, and object and their inner structure and cause-effect relationships recognized, wherein an extended SAO is defined, or eSAO, that includes at least seven types of elements: Subject, Action, Object, Adjective, Preposition, Indirect Object, and Adverbial.

The eSAOs are represented as extracted bits or lexical units that later allow one to obtain statistical (or empirical and semantic) scores of the sentences from the document. However, only those lexical units (e.g., patterns or identifiers) with significance are used for the above procedure; by significance it is meant that significant lexical units carry major meanings within the document.

A document sentence weighting module is used to quantitatively evaluate each sentence of the functionally analyzed document. For example, one or more of the following techniques may be used for weighting. Statistical weighting is based on assessing the weight of each sentence by calculating the frequency of its words and thereby determining whether the sentence would be relevant in the document summary. Using this approach the weight of a eSAO can be calculated by dividing the sum of the frequencies of its elements by the total number of words in the eSAO.

Cue-weighting can be used to provide a quantitative score of the importance of the information, taking into account explicit lexical signs (e.g., certain words or phrases). Further, this score is added to the empirical score obtained from an expert knowledge database (or base) in the form of patterns that operate with separate lexical units and tags.

Cause-effect (CE) weighting can be performed to provide a quantitative score of a sentence having a cause-effect relationship. The output of the weighting module is a function, or includes, the weights provided by the above weighting methods. A summarizer is used to analyze and output an integrated score for each sentence that is used during the process of summary generation.

A wide variety of different types of selectable documents summaries is made available, wherein different document summaries require different depths of analysis. Such document summaries can include a summary in the form of a list of keywords, topics, or eSAOs, or a field-oriented summary, or a classic summary. A classic summary is a document summary comprised of key phrases, concepts or sentences from the original document.

BRIEF DESCRIPTION OF THE DRAWINGS

The drawing figures depict preferred embodiments by way of example, not by way of limitations. In the figures, like reference numerals refer to the same or similar elements.

FIG. 7 is a list of informative tags, in accordance with FIG. 1.

FIG. 9 is an example of a key-word summary, in accordance with FIG. 8.

FIG. 10 is an example of a topic oriented summary, in accordance with FIG. 8.

FIG. 11 is an example of a ESAO summary, in accordance with FIG. 8.

FIG. 12 is an example of a classic summary, in accordance with FIG. 8.

FIG. 13 is an example of a field-oriented summary, in accordance with FIG. 8.

DETAILED DESCRIPTION OF THE PREFERRED EMBODIMENTS

A system and method for summarizing the contents of a natural language document provided in electronic or digital form includes preformatting the document, performing linguistic analysis, weighting each sentence in the document according to a set of weighting techniques, and generating one or more document summaries, from a set of selectable document summary types. Document summaries may be generated as a function of a set of weights of the sentences in the document.

Figure 1:
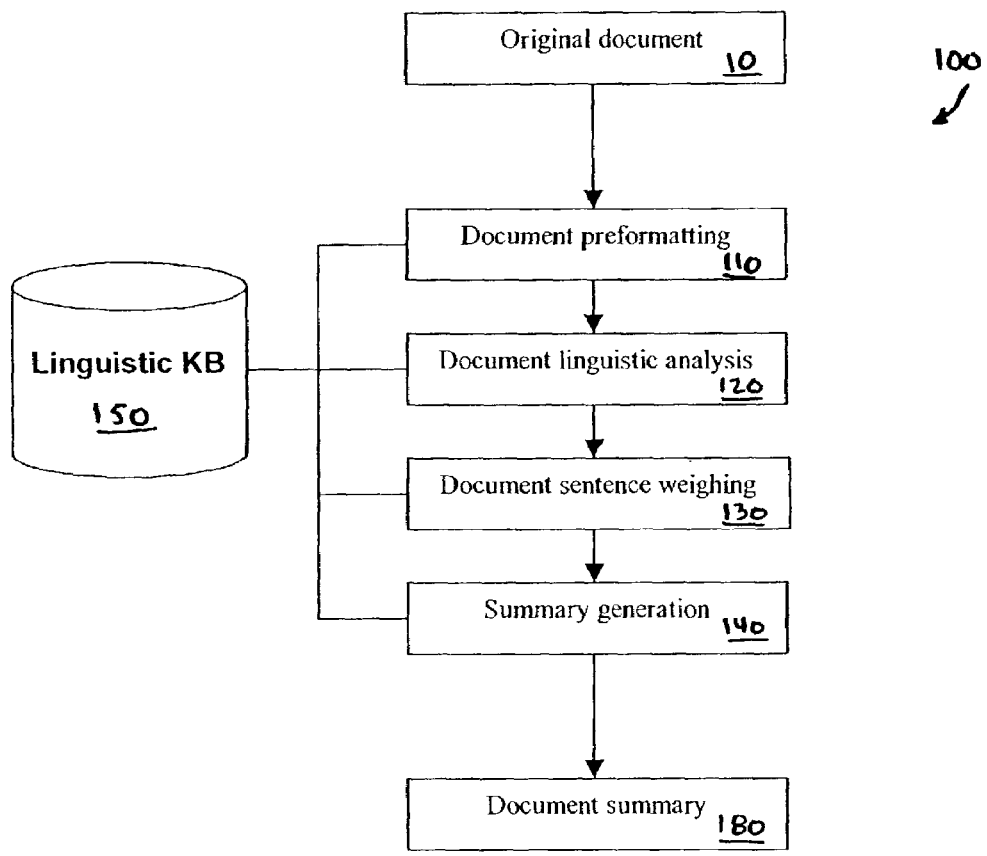
FIG. 1 is a diagram of a method of document summarization, in accordance with the preferred embodiment of the present invention.

One embodiment of a summarizer in accordance with the present invention may be appreciated with reference to FIG. 1. The summarizer processes an original document 10 to generate at least one document summary 180. In this embodiment, the summarizer implements the steps 100 of FIG. 1 and includes a preformatter (for preformatting the original document in step 110), a linguistic analyzer (for performing linguistic analysis in step 120), a sentence weighting module (for weighting sentences in step 130), a summary generator (for generating one or more document summaries in step 140) and a linguistic knowledge base 150. The functionality of all of the modules of the document summarizer may be maintained within the linguistic knowledge base 150, which includes various databases, such as dictionaries, classifiers, statistical data, and so on, and a database for recognizing linguistic models (for text-towords splitting, recognition of noun phrases, verb phrases, subject, object, action, attribute, cause-effect recognition, and so on). In various embodiments, preformatting may not be required.

Figure 2:
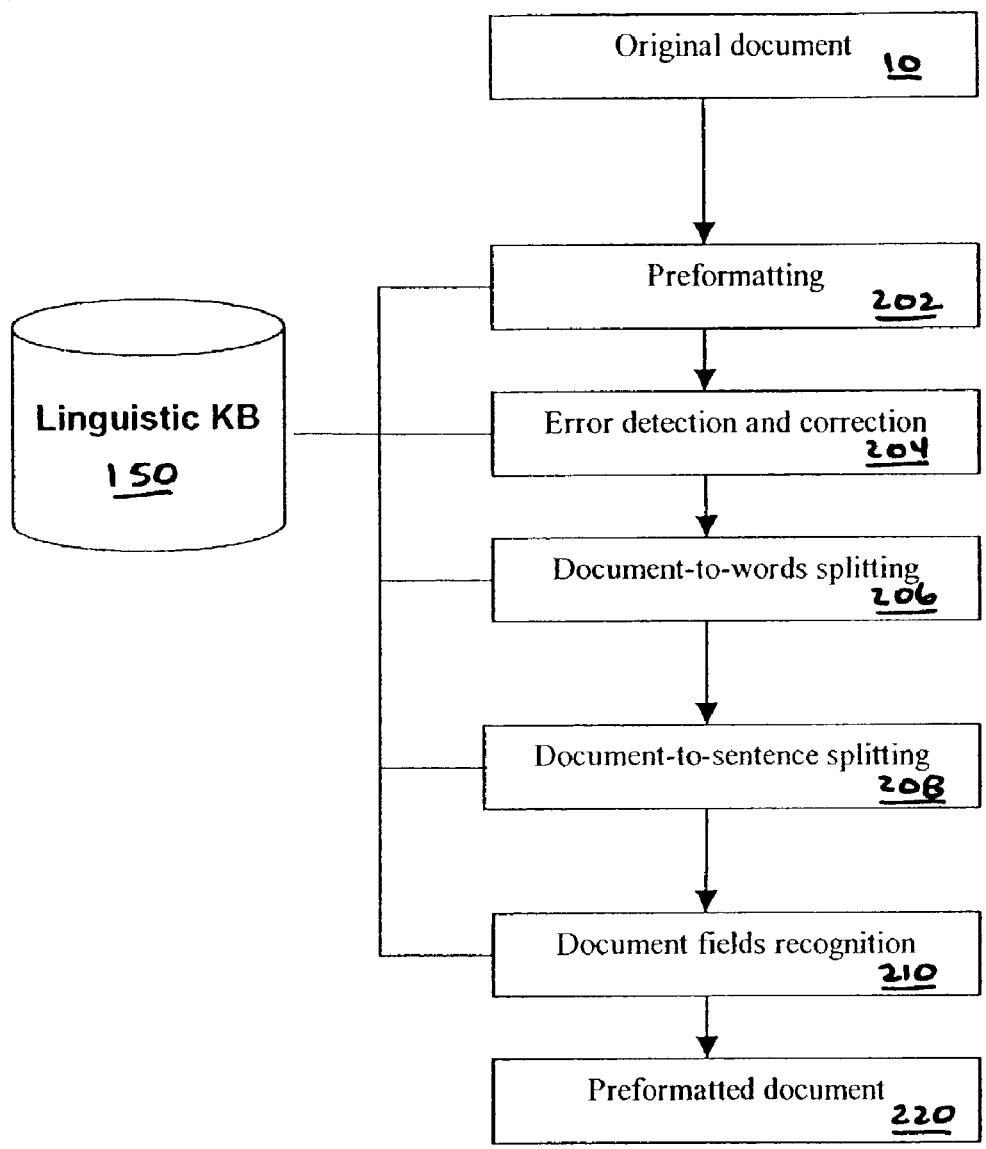
FIG. 2 is a diagram of an embodiment of a method for preformatting a document, in accordance with FIG. 1.

A method 200 in accordance with the preferred embodiment for preformatting document 10 is shown in FIG. 2. The preformatter receives original document 10 and in step 202, removes any formatting symbols and other symbols that are not part of natural language text. As examples, formatting symbols may include, but are not limited to, paragraph marks, tab characters and other symbols may include, but are not limited to, font color, font size and so on. In step 204, any mismatches and mistakes are identified and are automatically corrected. An example of a mismatch includes "the value depend on" and an example of a mistake includes "the values depens on". Other types of mismatches and mistakes are known to those skilled in the art. Mismatches and mispellings may be corrected, for example, by an Error Detection and Correction module.

In step 206, document text is divided into words and, in step 208, document text is divided into sentences. Summarizer 110 also recognizes, in step 210, certain fields in the document text, such as, for example, in the text of an issued U.S. patent, as shown in Table 1.

TABLE 1

Recognition of Fields, Patent Document

| Parts of a patent | Contents of the part |
| --- | --- |
| Number | Patent number |
| Date | Date |
| Inventor | Inventor's name |
| Assignee | Assignee's name |
| Reference | References to related documents |
| Title | Patent title |
| Abstract | Brief patent description |
| Background | Description of the drawbacks of previous solutions and problem formulation |
| Summary | General invention description |
| Drawings | Drawings description |
| Detailed Description | Detailed description of the preferred embodiment of the invention |
| Claims | Statements defining the scope of the property rights owned by the Assignee via the patent |

TABLE 2

Recognition of Fields, Article

| Part of an article | Contents of the part |
| --- | --- |
| Title | Title of the article |
| Author | Author of the article |
| Abstract | Brief article description |
| Introduction | Introduction |
| Discussion | Discussion of the problem |
| Conclusion | Conclusions |
| Acknowledgment | Acknowledgement |

Therefore, with regards to Table 1 and Table 2, several fields have been identified and the original document will be processed by the preformatter with knowledge of this context. The output of the preformatter is a preformatted document 220.

Figure 3:
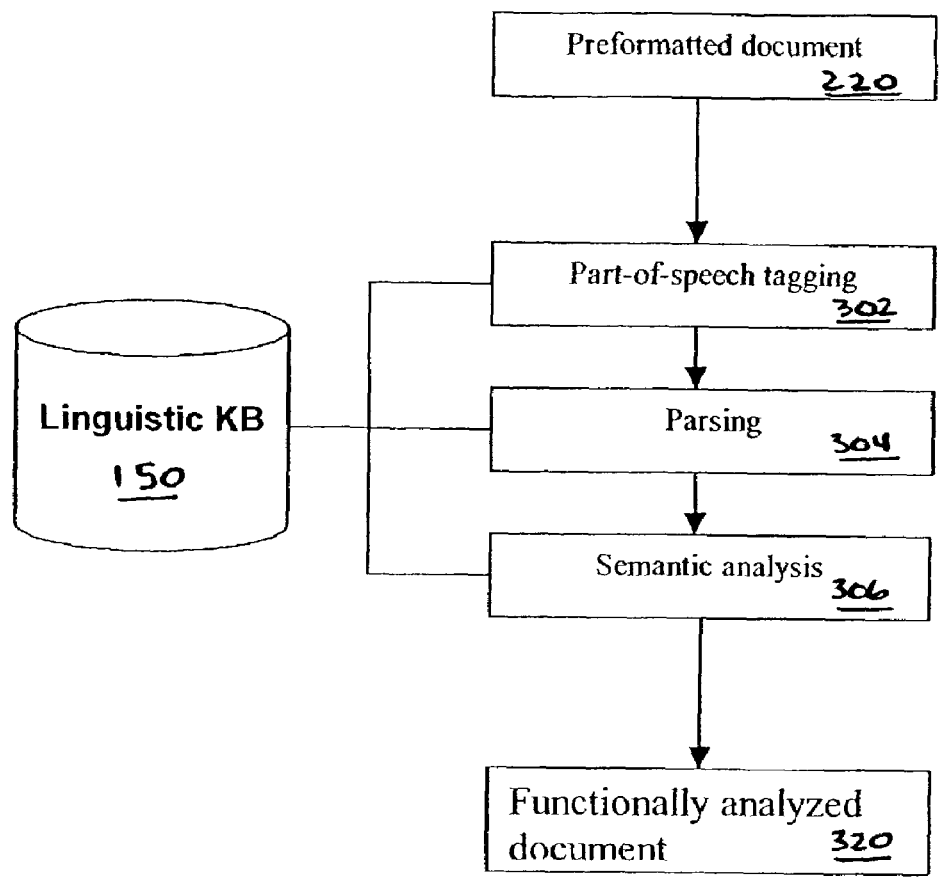
FIG. 3 is a diagram of an embodiment of a method for linguistic analysis, in accordance with FIG. 1

A method 300 in accordance with the preferred embodiment of performing linguistic analysis on the preformatted document 220 is shown in FIG. 3. Linguistic analysis may be performed by an analyzer that accomplishes tagging of words based on part of speech, its parsing 304, semantic analysis 306, and the output of a functionally analyzed document 320.

Additionally, semantic processing may be appreciated in light of commonly owned U.S. patent application Ser. No. 09/541,182, entitled Sentence Processor and Method with Knowledge Analysis of and Extraction From Natural Language Documents, filed Apr. 3, 2000, which is incorporated herein by reference.

At the step 302, each word of the document is assigned a part-of-speech tag. The analysis of the text to determine how to tag words is supplemented with statistical data included in linguistic knowledge base 150. Tags typically correspond to parts of speech. Examples of tags include: JJ—adjective, VB—verb, NN—noun, and so on. A list of such tags is provide in FIG. 7.

Figure 4:
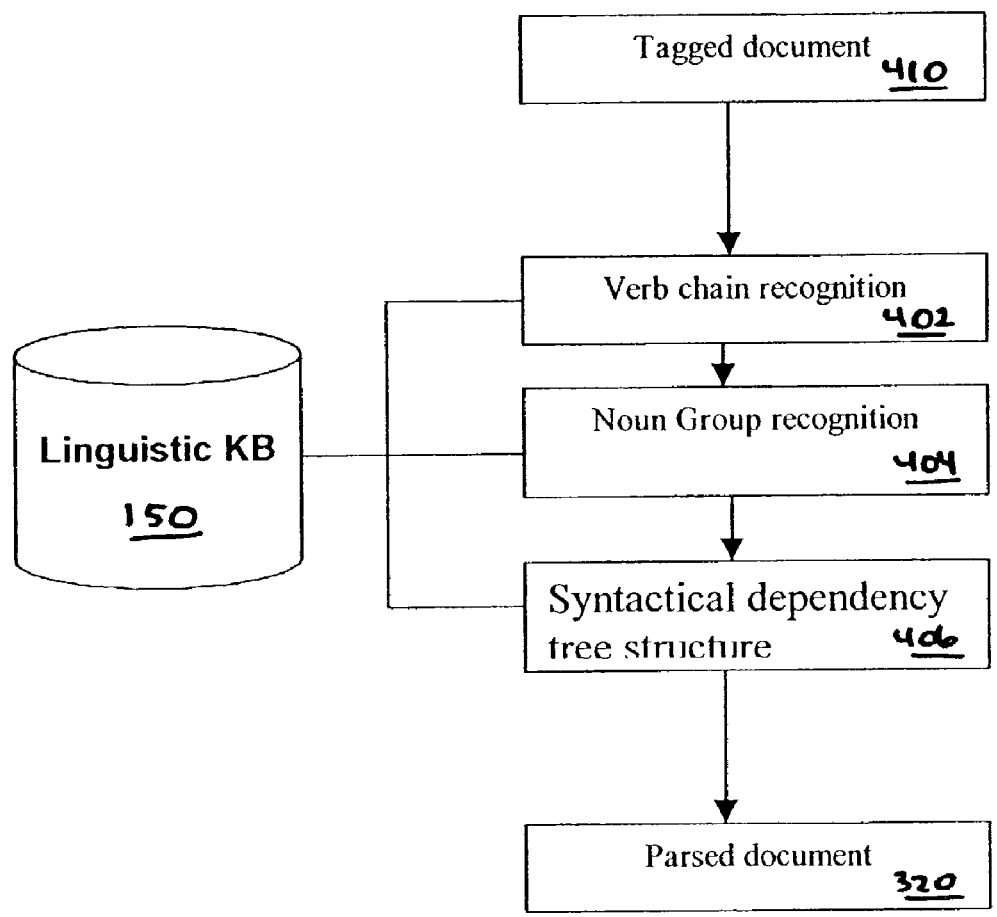
FIG. 4 is a diagram of an embodiment of a method for parsing a document, in accordance with FIG. 3.

A more detailed view of the parsing step 304 is provided in FIG. 4. During parsing, verbal sequences and noun phrases are recognized, in steps 404 and 406 respectively, from a tagged document 402 produced by in step 302 of FIG. 3. These verbal sequences and noun phrases are recognized by a parser.

In step 406, a syntactical parsed tree is built. To facilitate generation of the syntactical parsed tree, the linguistic knowledge base 150 includes Recognizing Linguistic Models. These models include rules for the structuring of a sentence, i.e., for correlating part-of-speech tags, syntactic and semantic classes, and so on, which are used in text parsing and extended subject (S), action (A), and object (O) (ESAO) extraction for building syntactic and functional phrases, as discussed below.

The syntactical parsed tree construction includes a plurality of separate stages. Each stage is controlled by a set of rules. Each rule creates a syntactic group, or node in the syntactical parsed tree. As an example, a core context-sensitive rule can be defined by the following formula:

UNITE
[element_1 . . . element_n] AS Group_X
IF
left_context=L_context_1 . . . L_context_n
right_context=R_context_1 . . . R_context_n This rule means that the string in brackets, i.e., [element_1 . . . element_n] must be united and further regarded as a syntactic group of a particular kind, i.e., Group X in this case, if elements to the left of the string conform to the string defined by the left-context expression, and elements to the right of the string conform to the string defined by the right-context expression. An element is a word that has been tagged as previously described. Elements can be POS-tags or groups formed by the UNITE command. All sequences of elements can include one or more elements. One or both of the context strings defined by left-context and right-context may be empty.

In the preferred form there are two types of stages (or progressions)—forward and backward stages. With a forward stage, the sentence is scanned beginning from the first element to the last element, element by element, position by position. With a backward stage, the sentence is scanned from the end of the sentence to the beginning of the sentence. At each position of the scan stage, the rules are applied to the sentence. If the element or elements being scanned match the ones defined in brackets in one of the stage rules, and context restricting conditions are satisfied, these elements are united as a syntactic group, or node, in the parsed tree. Once this is accomplished, the scanning process returns to the first (or the last, in case where the stage is backward) position of the sentence, and the scan begins again. The stage is over only when the scanning process reaches the end (or the beginning, depending on which stage it is, forward or backward) of the sentence not starting any rule. In accordance with the present invention, after a rule has worked, elements united into a group become inaccessible for further rules. Instead, the group that was formed represents these elements from that point forward.

To better illustrate the above, take a very simple example:
Input sentence:
The device has an open distal end.
The_DEF_ARTICLE device_NOUN has_HAVE_s an_INDEF_ARTICLE open_ADJ_distal_ADJ end_NOUN._PERIOD
Grammar:
BEGIN BACKWARD STAGE
UNITE
[(ADJ or NOUN) (NOUN or Noun-Group)] AS Noun-Group
IF
left_context=empty
right-context=empty
UNITE
[(DEF_ARTICLE or INDEF_ARTICLE) (NOUN or Noun Group)] AS Noun_Group
IF
left_context=empty
right-Context=empty
END_BACKWARD_STAGE
Rule 1 (ADJ and NOUN): Pass 1:
The_DEF_ARTICLE device_NOUN has_HAVE_s an_INDEF_ARTICLE open
(Noun_Group: distal ADJ end_NOUN)._PERIOD
Rule 1 (ADJ and Noun-Group): Pass 2:
The_DEF_ARTICLE device_NOUN has_HAVE_s an_INDEF ARTICLE
(Noun_Group: open_ADJ (Noun_Group: distal_ADJ end_NOUN))._PERIOD
Rule 2 (INDEF_ARTICLE and Noun_Group): Pass 3:
The_DEF ARTICLE device_NOUN has_HAVE_s
(Noun_Group: an_INDEF_ARTICLE (Noun Group: open_ADJ (Noun Group: distal_ADJ end_NOUN)))._PERIOD
Rule 1 (DEF_ARTICLE and NOUN): Pass 4:
(Noun_Group: The DEF_ARTICLE device_NOUN) has_HAVE_s
(Noun-Group: an_INDEF_ARTICLE (Noun_Group: open_ADJ (Noun_Group: distal_ADJ end_NOUN)))._PERIOD Now there exists two nodes or groups, i.e., noun groups. Only one more rule is needed to unite a noun group, i.e., HAS_verb, and another noun group as a sentence.

Thus, in the preferred form, the first stage in parsing deals with POS-tags, then sequences of POS-tags are gradually substituted by syntactic groups. These groups are then substituted by other groups, higher in the sentence hierarchy, thus building a multi-level syntactic structure of sentence in the form of a tree, i.e., the syntactical parsed tree. For instance, with reference to the tags of FIG. 7, consider a semantic tree for the following examples:

Input sentence 1:
A guide cascaded with the dephasing element completely suppresses unwanted modes.

```
w_Sentence
    w_N_XX
        w_NN
            a_AT
            guide_NN
            w_VBN_XX
                cascaded_VBN
                w_1N_N
                    with_IN
                    w_NN
                        the_ATI
                        w_NN
                            dephasing_NN
                            element_NN
    w_VBZ_XX
        w_VBZ
            completely_RB
            suppresses_VBZ
        w_NNS
            unwanted_JJ
            modes_NNS
```

Input Sentence 2:
The maximum value of x is dependent on the ionic radius of the lanthanide element.

```
w_Sentence
    w_NN
        w_NN
            the_ATI
            w_NN
                maximum_JJ
                value_NN
        of_IN
        x_NP
    w_BEX_XX
        is_BEZ
    w_JJ_XX
        dependent_JJ
        w_IN_N
            on_IN
            w_NN
                w_NN
                    the_ATI
                    w_NN
                        ionic_JJ
                        radius_NN
                of_IN
                w_NN
                    the_ATI
                    w_NN
                        lanthanide_NN
                        element_NN
```

Returning to FIG. 3 and FIG. 4, the product of step 406, which is the final sub-step of the semantic analysis 306, is a parsed document 320, including the syntactical parsed tree.

Figure 5:
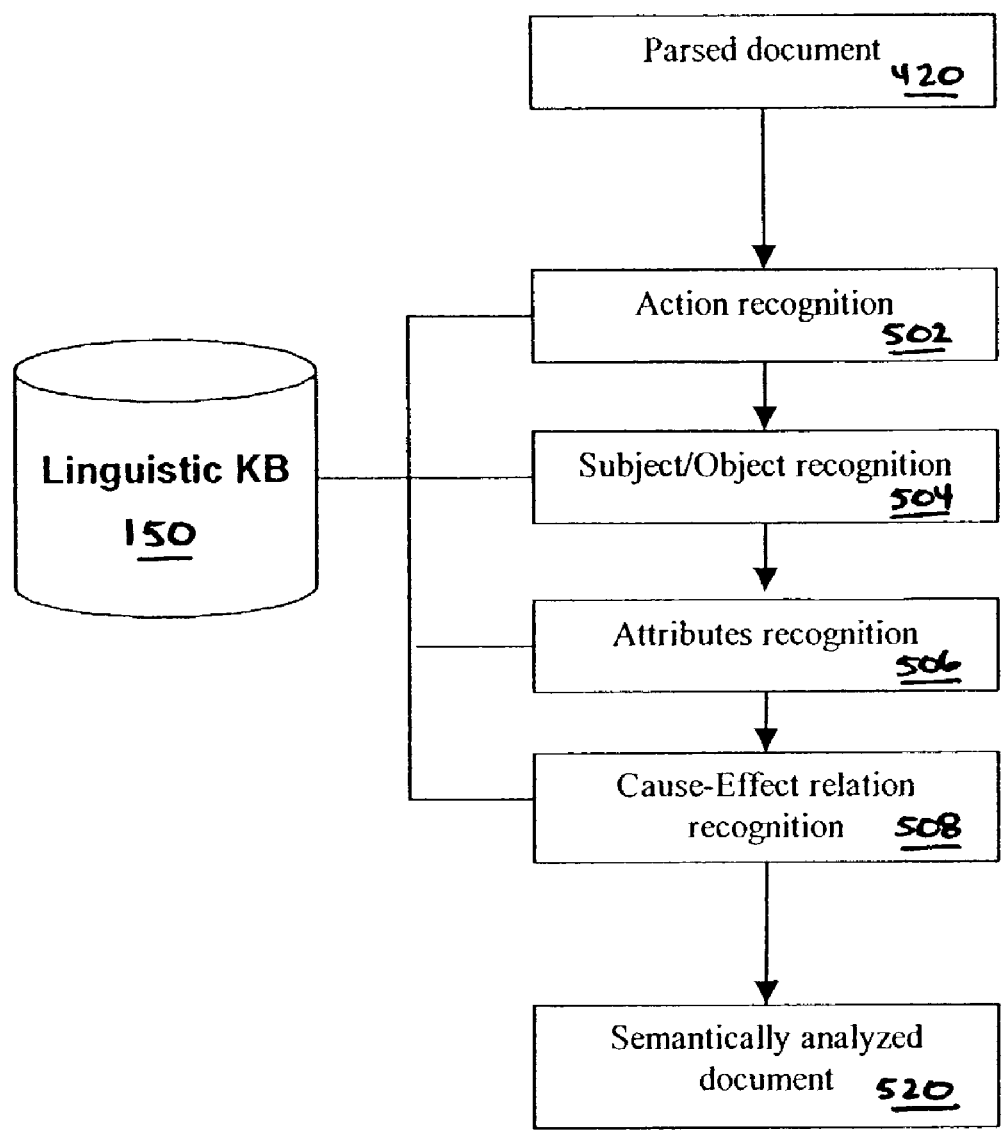
FIG. 5 is a diagram of an embodiment of a method for semantic analysis, in accordance with FIG. 3.

Referring to FIG. 5, at this stage of document semantic analysis, semantic elements are recognized as being of the type: subject (S), action (A), object (O), in steps 502 and 504. Additionally, in step 506, explicit attributes of the elements are expressed as being a preposition, an indirect object, an adjective, or adverbial. The inner structure (i.e., the objects proper and their attributes) of Subject-S, Object-O and Indirect Object-iO are recognized in step 508. Also, certain semantic relations between eSAOs are recognized, such as Cause-Effect relationships, in step 508.

Note that in prior art systems SAOs included only three components or element types: subject (S), Action (A), and Object (O). From these, at least one of them must be filled. However, in accordance with the present invention, expanded SAOs (or eSAOs) are used. In the preferred embodiment, eSAO's include seven components, from which at least one of them is filled, but these additional distinctions provide a greater depth and quality of analysis. In other embodiments, the eSAOs could be expanded to include more or different components.

In the preferred form, eSAO components include:
1. Subject (S): which performs action A on an object O;
2. Action (A): performed by subject S on an object O;
3. Object (O): acted upon by subject S with action A;
4. Adjective (Adj)—an adjective which characterizes subject S or action A which follows the subject, in a SAO with empty object O (ex: "The invention is efficient.", "The water becomes hot.");
5. Preposition Prep: a preposition which governs an Indirect Object (e.g., "The lamp is placed on the table.", "The device reduces friction by ultrasound.");
6. Indirect Object (iO): a component of a sentence manifested, as a rule, by a noun phrase, which together with a preposition characterizes action, being an adverbial modifier. (e.g., : "The lamp is placed on the table.", "The device reduces friction by ultrasound.");
7. Adverbial (Adv): a component of a sentence, which characterizes, as a rule, the conditions of performing action A. (e.g., "The process is slowly modified.", "The driver must not turn the steering wheel in such a manner.")

Examples of application of the eSAO format are:
Input sentence 1:
A guide cascaded with the dephasing element completely suppresses unwanted modes.
Output:
Subject: guide cascaded with the dephasing element
Action: suppress
Object: unwanted mode
Preposition: (none)
Indirect Object: (none)
Adjective: (none)
Adverbial: completely
Input sentence 2:
The maximum value of x is dependent on the ionic radius of the lanthanide element.
Output:
Subject: maximum value of x
Action: be
Object: (none)
Preposition: on
Indirect Object: ionic radius of the lanthanide element
Adjective: dependent
Adverbial: (none)

Subject S, Object O and idirect Object iO have their inner structure, which is recognized by the summarizer and includes the components proper (Sm, Om, iOm) and their attributes (Attr (Sm), Attr (Om), Attr (iOm)). The elements of each of the pairs are in semantic relation P between each other. The elements Sm, Om, iOm can be denoted as (Om, then Subject S, Object O and Indirect Object iO are predicate elements of the type P(Attr (Ôm), Ôm). In the preferred form, the summarizer considers and recognizes the following types of relations for P: Feature (Parameter, Color, etc.), Inclusion, Placement, Formation, Connection, Separation, Transfer, and so on.

Examples are provided as follows, wherein, for simplicity, only sentence fragments are given, which correspond to the S, O or iO.
Input sentence fragment 1:
Cc-TZP materials with $CeO_2$ content
Output:
P=Formation/with
Attr (Ôm)=$CeO_2$ content
Ôm=Ce-TZP materials
Input sentence fragment 2:
rotational speed of freely suspended cylinder
Output:
P=Feature (Parameter)/of
Attr (Ôm)=rotational speed
Ôm=freely suspended cylinder
Input sentence fragment 3:
ruby color of Satsuma glass
Output:
P=Feature (Color)/of
Attr (Ôm)=ruby color
Ôm=Satsuma glass
Input sentence fragment 4:
micro-cracks situated between sintered grains
Output:
P=Placement/situated between
Attr (Ôm)=sintered grains
Ôm=micro-cracks
Input sentence fragment 5:
precursor derived from hydrocarbon gas
Output:
P=Formation/derived from
Attr (Ôm)=hydrocarbon gas
Ôm=precursor
Input sentence fragment 6:
dissipation driver coupled to power dissipator
Output:
P=Connection/coupled to
Attr (Ôm)=power dissipator
Ôm=dissipation driver
Input sentence fragment 7:
lymphoid cells isolated from blood of AIDS infected people
Output:
P=Separation/isolated from
Attr (Ôm)=blood of AIDS infected people
Ôm=lymphoid cells
Input sentence fragment 8:
one-dimensional hologram pattern transferred to matrix electrode
Output:
P=Transfer/transferred to
Attr (Ôm)=matrix electrode
Ôm=one-dimensional hologram pattern The components Ôm proper can also be predicate elements. In the above examples, that is, for instance, Ôm=freely suspended cylinder, Ôm=one-dimensional hologram pattern. It should be noted that for information retrieval and summarization purposes it is beneficial to recognize the structure of Subject, Object and Indirect object, that is Attr (Ôm) and Ôm than the types of relation P.

The recognition of all these elements is implemented by means of the corresponding Recognizing Linguistic Models. These models describe rules that use the part-of-speech tags, lexemes and syntactic categories, which are then used to extract from the parsed text eSAOs with finite actions, non-finite actions, and verbal nouns. One example of an action extraction rule is:
<HVZ><BEN><VBN>then (<A>=<VBN>)

This rule means that "if an input sentence contains a sequence of words w1, w2, w3 which at the step of part-of-speech tagging obtained HVZ, BEN, VBN tags, respectively, then the word with VBN tag in this sequence is an Action". For example, has_HVZ been_BEN produced_VBN then (A=produced).

The rules for extraction of Subject, Action and Object are formed as follows:

1. To extract the Action, tag chains are built, e.g., manually, for all possible verb forms in active and passive voice with the help of a classifier. For example, have been produced=<HVZ><BEN><VBN>.

2. In each tag chain the tag is indicated corresponding to the main notion verb (e.g., in the above example –<VBN>). Also, the type of the tag chain (e.g., active or passive voice) is indicated.

3. The tag chains with corresponding indexes formed at steps 1–2 constitute the basis for linguistic modules extracting Action, Subject and Object. Noun groups constituting Subject and Object are determined according to the type of tag chain (e.g., active or passive voice).

There are more than one hundred rules in the exemplary embodiment of the present invention for action extraction. Generally, these rules take the above form and are created according to the above steps. As will be appreciated by those skilled in the art, rules of extraction are similarly formed for Subject and Object.

The recognition of such elements as Indirect Object, Adjective and Adverbial is implemented in the substantially the same way, that is, taking into account the tags and the structure itself of the syntactical parsed tree.

Recognition of Subject, Object and Indirect Object attributes is carried out on the basis of the corresponding Recognizing Linguistic Models. These models describe rules (i.e., algorithms) for detecting subjects, objects, their attributes (e.g., placement, inclusion, parameter, and so on) and their meanings in the syntactic parsed tree.

To identify parameters of an Object (e.g., Indirect Object, Subject) a Parameter Dictionary is used. A standard dictionary defines whether a noun is an object or a parameter of an object. Thus, a list of such attributes can easily be developed and stored in linguistic knowledge base 150 of FIG. 1. For example, temperature (=parameter) of water (=object). To identify attributes such as placement, inclusion and so on., linguistic knowledge base 150 includes a list of attribute identifiers, i.e. certain lexical units. For example, to place, to install, to comprise, to contain, to include and so on. Using such lists, the summarizer may automatically mark the eSAOs extracted by an eSAO extractor that corresponds to the attributes.

These algorithms work with noun groups and act like linguistic patterns that control extraction of above-mentioned relations from the text. For example, for the relations of type parameter-object, basic patterns are:

<Parameter> of <Object> and <Object><Parameter>

The relation is valid only when the lexeme which corresponds to <parameter>is found in the list of parameters included in the linguistic knowledge base 150. These models are used in attribute recognition, step 506 of FIG. 5, of the semantic analyzer module. Thus, the semantic analyzer outputs, in step 506, an eSAO in the form of a set of 7 fields, where some of the fields may be empty, as previously discussed.

Also, in FIG. 5 step 508, a cause-effect relations recognizer uses the Recognizing Linguistic Models for detecting semantic relations between eSAOs, which are stored into linguistic knowledge base 150. These models describe algorithms for detecting cause-effect relations between eSAOs using linguistic patterns, lexemes and predefined codes (or tags) from a list of codes (or tags). The cause-effect relations recognizer recognizes semantic relations such as Cause-Effect between eSAOs (complete or incomplete). For this purpose, a large corpus of sentences which include two or more eSAOs (complete or incomplete) automatically extracted by cause-effect relations recognizer are analyzed to build a list of patterns or identifiers (i.e., certain lexical units) indicating the presence of the semantic relations in the sentence. Each type of identifier designates which of the eSAOs is Cause and which is Effect. For example:

1. "if eSAO-1=Cause then eSAO-2=Effect" This phrase means that if two eSAOs are found in a sentence, the first one preceded by word "if" and the second one preceded by word "then", then the first eSAO is considered the Cause and the second one is considered the Effect.

2. "eSAO-1=Effect if eSAO-2=Cause" This phrase means that the first of two eSAOs is considered the Effect and the second one is considered the Cause if there is a word "if" is between them.

Such a list of identifiers makes it possible to automatically recognize semantic relations between eSAOs. As will be appreciated by those skilled in the art, these are two examples of the many identifiers that may defined. These patterns describe the location of cause and effect in the input sentence. For example, the condition: when caused+TO+VB shows that the Cause is to the right of the word caused and is expressed by an infinitive and a noun group that follows it. The Effect is to the left from the word caused and is expressed by a noun group, e.g.:

Isolated DNA regulatory regions can be employed, for example, in heterologous constructs to selectively alter gene expression.

Cause:
Subject: Isolated DNA regulatory regions
Action: can be employed
Adjective:
Object:
Preposition: in
Indirect Object: heterologous constructs
Adverbial:
Effect:
Subject:
Action: to alter
Adjective:
Object: gene expression
Preposition:
Indirect Object:
Adverbial: selectively Thus, with reference to FIG. 3 and FIG. 5, the output of the semantic analysis 306 is a functionally analyzed document 320, that is a document in which eSAOs (complete or incomplete) with attributes for S, A, O and their inner structure and Cause-Effect relations between eSAOs are recognized. The functionally analyzed document is passed to document sentence weighting, step 108 of FIG. 1.

Figure 6:
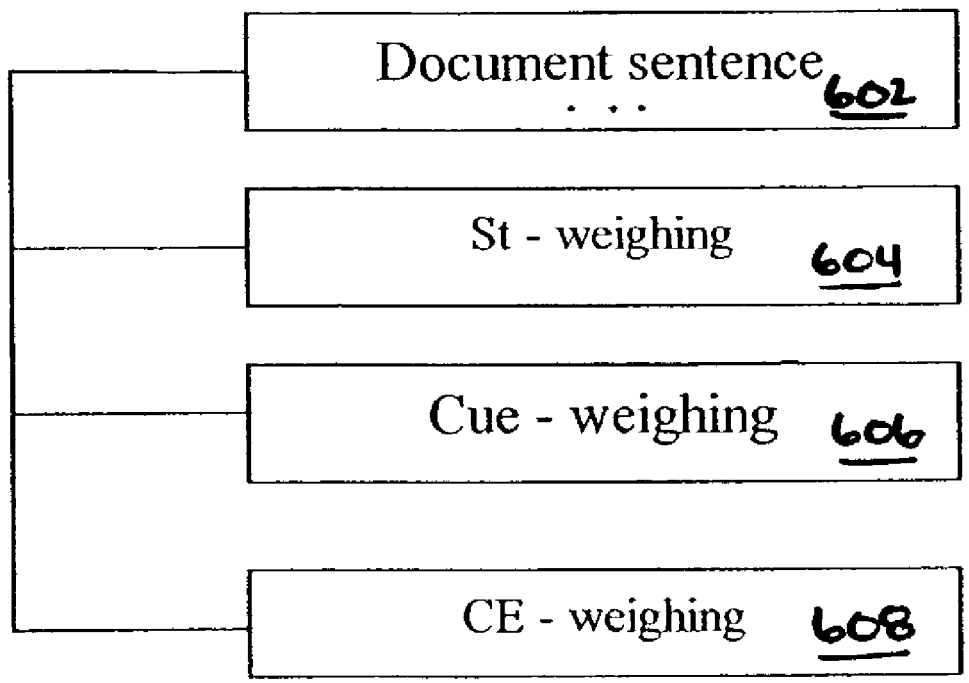
FIG. 6 is a diagram of an embodiment of a method for sentence weighting, in accordance with FIG. 1.

The document sentences weighting module, the method of which is depicted in FIG. 6, determines and assigns weights to sentences 602 of the document 320. That is, the document sentences weighting module evaluates quantitatively the importance of each sentence 602 of the document. In the preferred form, one or more of three types of weighting are used, as described below, although other types of weighting could be used.

Statistical weighting (or St-weighting), 604 in FIG. 6, is based on assessing the weight of each sentence by calculating the frequency of its words and, thus, determining whether the sentence would be relevant in the summary. In preferred embodiment, the statistical weighting method is used to calculate the weight of eSAOs, so extraction of eSAOs is first required. However, in other embodiments, sentence weighting may be first accomplished, and then eSAO extraction. In the preferred form, the weight of a sentence is equal to the maximum weight of all of its eSAOs. At a first stage the weighting module calculates frequencies of notion words (meaning words tagged as verbs, nouns, adjectives or adverbs). On the whole, in the preferred embodiment, there are 32 such tags, shown in FIG. 7. However, in other embodiments, the set of tags may be fewer, greater or different than those shown in FIG. 7. It also makes a difference whether the tagged word is an object proper or whether it is an attribute of an object. For example, a tagged word that is an object proper may be weighted more heavily than a tagged word that is an object attribute. The frequencies calculated are then modified according to a formula (below) depending on the part of document (e.g., patent or article) where the word was found. For example, the frequency may be modified according to the following:

$$Qmodified = Qreal * kmax,$$

where kmax is the maximum of weight coefficients (specified in a table) among those defined for the document (e.g., patent or article), Qreal is the determined weights and Qmodified is the modified weight. For instance, assume the document was an issued U.S. patent or an article, the coefficients may be defined according to Table 3.

TABLE 3

Weight Coefficients

| Part of a patent | Weight coefficient | Part of an article | Weight coefficient |
|---|---|---|---|
| Title | 5 | Title | 5 |
| Abstract | 1 | Abstract | 1 |
| Background | 1 | Introduction | 1 |
| Summary | 2 | Discussion | 0.8 |
| Drawings | 1 | Conclusion | 1 |
| Embodiment | 0.8 | | |
| Description | 0.8 | | |
| Conclusion | 1 | | |
| Claims | 1.5 | | |

Words with a frequency lower then the average for the text are sorted out. The average frequency is determined by $$f = t/m$$

where t is the number of all forms of notion words in the text, m is the number of all lemmas of notion words in the text, including synonyms. The weight of an eSAO is calculated by division of the sum of frequencies of its elements by the total number of words in the eSAO.

Cue-weighing, item 606 in FIG. 6, provides a quantitative score of the importance of the information (or "informativity"), taking into account explicit lexical signs of importance, i.e., separate words and phrases. Such cue words are determined as a function of lexical patterns of sentences, phrases or other text. As an example, it is known in the art that, thorough analysis of a large number of documents, these patterns can be determined. Additionally, the weight of each pattern, i.e., positive or negative, can also be determined from this same analysis. In such cases, positive corresponds to informative and negative corresponds to uninformative.

Examples of such patterns are as follows:
1. Cue pattern utilized to select sentences characterizing feature of the invention:
   (economical+$Formula(technique|technology){$p=3}+ of{$P=1}){$W=0.9}

This pattern selects sentences containing a phrase like "economical:technology of", where the dots means two or less words. The weight of this pattern is 0.9, in the preferred embodiment. It is taken as Wcue for sentences corresponding to the above pattern.

2. Cue pattern utilized to filter uninformative sentences from the summary may be determined according to the following:
   Relation ($Type=ESAO
   Subject (!$Every {$a})
   Action (contain)
   Object (design & feature|design & embodiment)
   Preposition (in)
   IndirectObject (figure:figures)
   )){$W=100}

This pattern selects sentences containing a specific relationship, which indicates that the sentence is for locating the design of embodiment in some figures. The weight of this pattern is 100 and the weight of corresponding sentences is decreased by 100 percent. The final estimation of sentence will be 0. In the preferred form, there exists over 600 of these "positive" patterns and nearly 250 "negative" patterns. As will be appreciated by those of ordinary skill in the art, these patterns can be generated as a function of analysis of commonly available documents, without undue experimentation.

CE-weighing, item 608 in FIG. 6, provides quantitative scores of a sentence having a Cause-Effect relationship, i.e., if a Cause-Effect relationship is detected within a sentence, this sentence is given a certain weight. The output weight W of the sentence weighting module, which contains the weight of every sentence of the document, is calculated using the following formula:

$$W = a_{st} * W_{st} + a_{cue} * W_{cue} + a_{ce} * W_{ce}$$

where:
$W_{st}$—statistical score of the sentence;
$W_{cue}$—cue score of the sentence (0, if cue words were not found);
$W_{ce}$—CE-score of the sentence (0, if the sentence did not contain cause-effect relations);
$a_{st}$, $a_{cue}$, $a_{ce}$—preliminarily provided values for each weight type.

The value of the weight of each sentence varies from −1 to 1, and the values of all other weight elements of the formula vary from 0 to 1.

As an example of the weighting module output, the preferred embodiment of the present invention may be applied to U.S. Pat. No. 5,742,908.

1. Document Preformatting.

In the given patent the following text parts were determined: Title of patent, Abstract, Background, Summary, Drawing, Description, and claims. The preferred summarizing algorithm may be appreciated by applying it to a sentence from Description of the patent. Therefore, as an example, assume the following input sentence:

According to one embodiment of the present invention, the satellite can precompensate its transmit frequency so that the error due to Doppler is cancelled at the center of the cell or beam.

2. Linguistic Analysis of the Document.

As a result of the lexical-grammatical analysis every word and set phrase of the sentence obtains a lexical-grammatical code, as follows:

According to_IN one_CD1 embodiment_NN of_N the_ATI present_JJ invention_NN,_, the_ATI satellite_NN can_MD precompensate_VB its_PP$ transmit_NN frequency_NN so that_CS the_ATI error_NN due to_IN Doppler_NP is_BEZ cancelled_VBN at_IN the_ATI center_NN of_IN the_ATI cell_NN or_CC beam_NN._.

As a result of the grammatical and semantic analysis, the following semantic relations are identified for the given sentence: two SAOs (Table 4) and one Cause-Effect (Table 5). For brevity, a simplified version of the eSAO is shown, that is SAO:

TABLE 5

Sample Partial SAO

| Subject | Action | Object |
|---|---|---|
| Satellite | precompensate | its transmit frequency |
| X | cancel | error |

TABLE 6

Sample Partial Cause - Effect

| Cause | Effect |
|---|---|
| satellite - precompensate - its transmit frequency | X - cancel - error |

According to the algorithm, only some words are informative, the codes (or tags) of which are included in the list of 32 meaningful tags in FIG. 7. In the given sentence such words are: embodiment, present, invention, satellite, precompensate, transmit, frequency, error, Doppler, cancelled, center, cell, beam (see Table 7).

3. Getting Statistical SAO Estimation.

In this example, a combination of positional method (when calculating the word frequency) and statistical method is used. In table 7, in the last column the frequencies of the words that will be used to calculate the SAO estimation are cited. For instance, the word "frequency" occurred in the text 85 times in different text parts, including the Title. As this text part has the greatest weight coefficient (being equal to 5), the modified value will be: 85*5=425, for use in further calculations. The average frequency of word occurrence in the given patent is 4.47, which is why all words with a lesser frequency are not considered in the further analysis. In this case, the words "precompensate" and "cancel" do not meet the average.

TABLE 7

Word Frequency

| Word lemma | Real frequency | Text part which used to compute final frequency | Final frequency |
|---|---|---|---|
| Embodiment | 11 | Summary | 22 |
| Present | 18 | Summary | 36 |
| Invention | 23 | Summary | 46 |
| Satellite | 66 | Summary | 132 |
| Precompensate | 4 | Description | 0 |
| Transmit | 9 | Summary | 18 |
| Frequency | 85 | Title | 425 |
| Error | 31 | Title | 155 |
| Doppler | 50 | Summary | 100 |
| Cancel | 1 | Description | 0 |
| Center | 10 | Description | 8 |
| Cell | 13 | Description | 10.4 |
| Beam | 28 | Description | 22.4 |

The maximum unnormalized statistical SAO estimation in the given text (marked as "M") is equal to 425. The estimations of SAOs are calculated in the given sentence as follows:

a) The first SAO contains three informative words: satellite, transmit, and frequency.

Unnormalized estimation: (132+18+425)/3=191.67

Normalized estimation: $W_{st}$=191.67/M=0.45 b) The second SAO contains one informative word: error.

Unnormalized estimation: 155/1=155

Normalized estimation: $W_{st}$=155/M=0.36

4. Getting an Estimation from Cue Words.

In the given sentence one of the patterns from the linguistic knowledge base 150 was found:

"embodiment of . . . invention"

Its formal description is the following:

($Formula(arrangement|embodiment)+of{$p=1}+invention{$p=3}){$w=0.3}

The estimation of the weight of the given pattern is equal to 0.3, i.e. we have $W_{cue}$=0.3.

5. Getting Estimation from Cause-Effect.

Cause-Effect is a special type of a cue word with a permanent, preset weight of 0.8. In this case, as Cause-Effect is present in the sentence (see Table 7), where $W_{ce}$=0.8.

6. Getting Final Estimation of a Sentence.

The final SAO estimation is calculated using the formula:

$$W = a_{st} * W_{st} + a_{cue} * W_{cue} + a_{ce} * W_{ce}$$

where $a_{st}$, $a_{cue}$, $a_{ce}$ are coefficients preset according to the results of the research. For example, their values are: $a_{st}$=0.6, $a_{cue}$ 0.2, $a_{ce}$=0.2. Accordingly, we have:

a) W1=0.6*0.45+0.2*0.3+0.2*0.8=0.49 b) W2=0.6*0.36+0.2*0.3+0.2*0.8=0.44

The final estimation of the sentence is equal to the largest SAO estimation, i.e. 0.49. According to the results of the comparison to other sentences, this estimation lets the given sentence get in the summary of the document.

Figure 8:
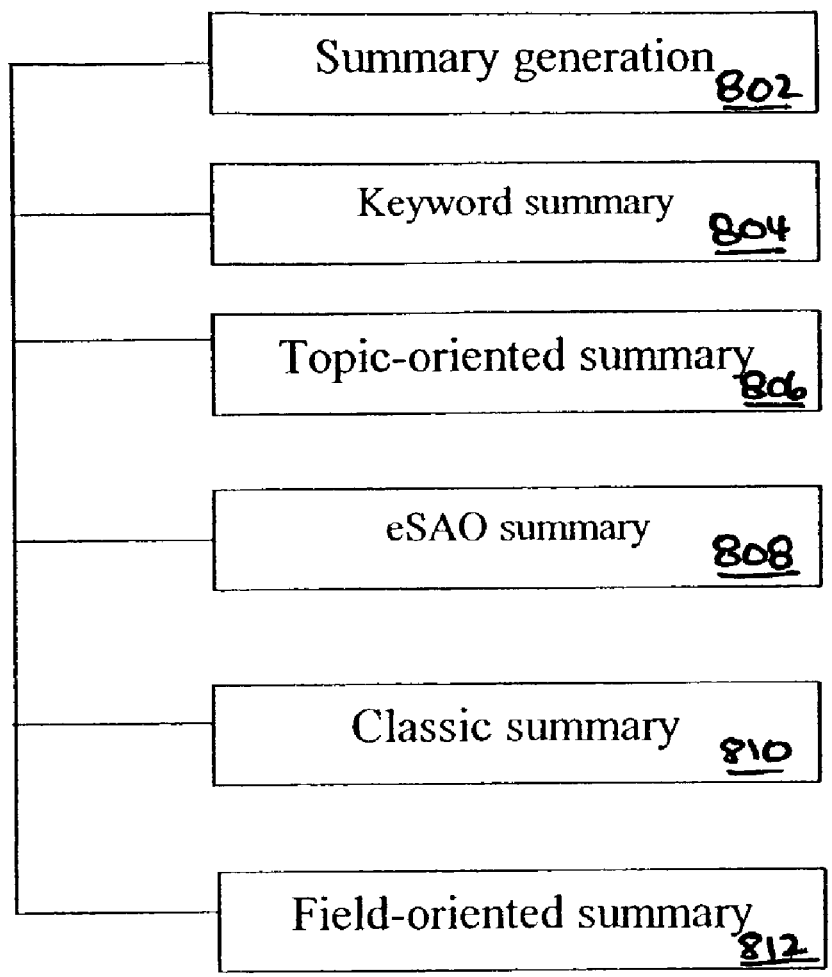
FIG. 8 is a diagram of an embodiment of a method for generating document summaries, in accordance with FIG. 1.

After the weighted score for each sentence of the document is obtained in step 130 of FIG. 1, the document is sent to the input of the summary generator, in step 802 FIG. 8, which can generate a certain type of summary from one or more available summary types, depending on the request. The request may come from a user, or some other system or subsystem. As examples, one or more of the following types of document summaries may be generated:

1. Keyword Summary, in step 804, produces a summary in the form of a list of keywords that are weighted noun groups (e.g., subjects and objects of complete or incomplete eSAO). These keywords are sorted by their St-weighted values, from the largest value to the smallest. A part of such a summary 900 for U.S. Pat. No. 5,359,324 is shown in FIG. 9.

2. Topic-oriented Summary, in step 806, produces a structured keyword summary 1000, as shown in FIG. 10.

3. eSAO Summary, in step 808, produces a summary presented as a list of eSAOs of the document, sorted by their weight, calculated as previously described. A part of such summary 1100 for the above mentioned patent is shown in FIG. 11.

There is a possibility to obtain a readable text representation of all of the above mentioned types of summary. This text would contain a list of the sentences in the summary along with corresponding elements, i.e. keywords, topics, and eSAOs. Sentences adjacent and logically bound to the sentences found are also included in this list. As previously noted, such logical connections are recognized by means of a set of patterns available from the linguistic knowledge base 150. Moreover, in the case of eSAO-summary, another type of summarized text representation can be obtained if requested by the user, which has the form of a list of simple sentences grammatically, correctly generated from the eSAOs found.

4. Classic Summary, in step 810, produces a document summary in the form of a list of the most informative sentences of the document, having their 'informativeness' calculated according to the formula described above. The order in which the sentences appear in the original document is conserved while presenting the summary. FIG. 12 shows a part of such a summary 1200.

5. Field-oriented Summary, in step 812, produces a summary as a set of predefined fields. Below is shown a variant of the nomenclature of such fields, as well as the nomenclature of document parts from which they are obtained.

TABLE 8

Summary Fields for Documents

| Summary Field | Patent parts used | Article parts used |
| --- | --- | --- |
| Task | Background, Summary, Abstract | Introduction |
| Solution | Summary, Description, Embodiments, Conclusions | Introduction, Discussion, Conclusion. |
| Features | Abstract, Description, Embodiments, Conclusions | Introduction, Discussion, Conclusion |
| References | Patent number, Title, Date, Inventor(s), Assignee | Title, Author(s) |

The summary generator, which may be a module configured to implement any of the foregoing document summaries, or other summaries (if defined), selects the most informative sentences (their weight is calculated using weighting formulae above) for each field of the summary, using "its own" parts of the document. This helps to avoid duplication of the sentences based on the priority of the fields of the summary provided by a user, for example. A part of such a summary 1300 is shown in FIG. 13.

Classic and Field-oriented summary generators may provide a certain amount of contraction, for example, deleting of an introductory part or sentences included in the summary. This function is implemented via linguistic patterns. Their number is about 120 in the preferred embodiment. Samples of these patterns are as follows:

1. Cue patterns utilized to delete parenthesis.

($Formula ('c_VBN'{$p=1}+in{$p=1}+word{$p=2}+ 'c_Comma'{& $p=1}) {$r=""})

2. Find and delete phrases like "Expressed in other words", "In that case", At this/that rate", "Due to such considerations", and so on.

($Formula($Formula(in|on|to|by|at|under|due^to)+$Formula (this|that|other|all|such|any|each|either|similar|these|most^of){$p=2}+$Formula (end|case|basis|connection|context|way|mean:'c_NNS'|regard|manner|fashion|event|example|rate|circumstances|consideration){$p=2}+c'_Comma'{$p=1 & $a}){$r=""})

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method for summarizing the contents of a natural language document including a plurality of sentences and provided in electronic or digital form, said method comprising:

A. extracting words from sentences in said document, including determining knowledge at a fact level for each sentence by:
  i) identifying the words within the sentence as parts of speech in the form of eSAOs, including identifying the words as at least one of subjects, objects, actions, adjectives, prepositions, indirect objects and adverbials; and
  ii) determining if Cause-Effect relationships exist in the sentence based on semantic relationships between eSAOs in the sentence;

B. determining a weight for each eSAO and a Cause-Effect weight for each Cause-Effect relationship;

C. determining a sentence weight for each sentence in said document, using the weights of all eSAOs for said sentence and, if the sentence has a Cause-Effect relationship, the Cause-Effect weight for each Cause-Effect relationship in the sentence; and D. generating one or more weight-based document summaries as a function of said sentence weights and at least one of displaying the summaries to a user and storing the summaries to a memory.

2. The method of claim 1, further including in step A determining attributes for at least some of said subjects, objects, and indirect objects, wherein an attribute represents a word or phrase having a relationship to the subject, object, or indirect object for which it is an attribute.

3. The method of claim 2, wherein said relationship is one or more of a feature, inclusion, placement, formation, connection, separation, or transfer.

4. The method of claim 3, wherein said relationship is a feature of a type of parameter.

5. The method of claim 1, wherein step A includes using Recognizing Linguistic Models to detect said semantic relationships between said eSAOs, wherein said Recognizing Linguistic Models describe algorithms for detecting said Cause-Effect relationships between said eSAOs using linguistic patterns, lexemes and predefined codes or tags from a list of codes or tags.

6. The method of claim 1, wherein step B is accomplished using statistical weighting, including determining said eSAO weight as a function of the frequency of appearance of components of said eSAOs in said document.

7. The method of claim 6, wherein the statistical weight of said sentence is a function of the maximum weight of each eSAO in said sentence.

8. The method of claim 1, further including determining a cue weight for each sentence using cue weighting, including determining said cue weight as a function of a quantitative importance of assigned to words and phrases, wherein said sentence weights are further determined as a function of said cue weights.

9. The method of claim 8, further including determining the Cause-Effect weight for each sentence using Cause-Effect weighting, including determining said Cause-Effect weight as a function of a quantitative score assigned to words and phrases having the Cause-Effect relationship.

10. The method of claim 1, further including determining the Cause-Effect weight for each sentence using Cause-Effect weighting, including determining said Cause-Effect weight as a function of a quantitative score assigned to words and phrases having a Cause-Effect relationship.

11. The method of claim 1, wherein one or more document summaries are selectable from a set of document summary types including at least one of a key-word summary, a topic-oriented summary, an eSAO summary, a classic summary, and a field-oriented summary.

12. The method of claim 1, wherein step D includes contracting said one or more weight-based document summaries by deleting introductory phrases and sentences as a function of a set of document patterns, wherein said document patterns identify said introductory phrases and sentences as having low relevance.

13. A method for summarizing the contents of a natural language document provided in electronic or digital form, said method comprising:
   A. performing linguistic analysis, including:
      i) extracting words from sentences in said document, including determining knowledge at a fact level for each sentence by:
         a. identifying the words within the sentence as parts of speech in the form of eSAOs, including identifying the words as at least one of subjects, objects, and actions, and tagging substantially each word as a function of a part of speech of said word; and
         b. determining if Cause-Effect relationships exist in the sentence based on semantic relationships between eSAOs in the sentence;
      ii) parsing verbal sequences and noun phrases from said tagged words; and
      iii) building a syntactical parsed tree from said verbal sequences and noun phrases, according to a set of rules, wherein words grouped by a rule become inaccessible to other rules;
   B. weighting each sentence in the document as a function of quantitative importance and said syntactical parsed tree, including determining a Cause-Effect weight for each Cause-Effect relationship in the sentence; and
   C. generating one or more weight-based document summaries, from a plurality of selectable document summary types, as a function of the sentence weights and at least one of displaying the summaries to a user and storing the summaries to a memory.

14. The method claim 13, further comprising, before step A:
   D. preformatting the document, including:
      i) removing symbols that are not part of the natural language text;
      ii) correcting mismatches and misspellings;
      iii) dividing the document into words and sentences; and
      iv) recognizing document fields.

15. The method of claim 13, wherein the form of eSAOs in step A further includes one or more of adjectives, prepositions, indirect objects and adverbials.

16. The method of claim 13, wherein step B includes determining a weight for each eSAO.

17. The method of claim 13, wherein step B includes determining a cue weight for each sentence.

18. A system for summarizing the contents of a natural language document provided in electronic or digital form, said system comprising:
   A. at least one memory having a set of linguistic rules stored therein;
   B. a linguistic analyzer coupled to said at least one memory and configured to:
      i) extract words from sentences in said document, including determining knowledge at a fact level for each sentence by:
         a. identifying the words within the sentence as parts of speech in the form of eSAOs, including identifying the words as at least one of subjects, objects, and actions, and tagging substantially each word as a function of a part of speech of said word; and
         b. determining if Cause-Effect relationships exist in the sentence based on semantic relationships between eSAOs in the sentence;
      ii) parsing verbal sequences and noun phrases from said tagged words; and
      iii) building a syntactical parsed tree from said verbal sequences and noun phrases, according to said set of rules, wherein words grouped by a rule become inaccessible to other rules;
   C. a sentence weighting module configured to access said syntactical phrase tree and to determine a weight tbr each sentence in the document as a function of quantitative importance and said syntactical parsed tree and if the sentence has a Cause-Effect relationship, determine the Cause-Effect weight for each Cause-Effect relationship in the sentence; and
   D. a summary generator configured to generate one or more weight-based document summaries, from a plurality of selectable document summary types, as a function of the sentence weights.

19. The system as in claim 18, further comprising:
   E. a preformatter configured for:
      i) removing symbols that are not part of the natural language text;
      ii) correcting mismatches and misspellings;
      iii) dividing the document into words and sentences; and
      iv) recognizing document fields.

20. The system of claim 18, wherein the form of eSAOs further includes one or more of adjectives, prepositions, indirect objects and adverbials.

21. The system of claim 18, wherein said sentence weighting module is further configured for determining a weight for each eSAO.

22. The system of claim 18, wherein said sentence weighting module is further configured for determining a cue weight for each sentence.

23. A system for summarizing the contents of a natural language document including a plurality of sentences and provided in electronic or digital form, said system comprising:
- A. at least one memory having a set of linguistic rules stored therein;
- B. a linguistic analyzer coupled to said at least one memory and configured to extract words from sentences in said document, including determining knowledge at a fact level for each sentence by:
  - i. identifying the words within the sentence as parts of speech in the form of eSAOs, including subjects, objects, actions, adjectives, prepositions, indirect objects and adverbials; and
  - ii. determining if Cause-Effect relationships exist in the sentence based on semantic relationships between eSAOs in the sentence;
- C. a weighting module configured to determine a weight for each eSAO and a Cause-Effect weight for each Cause-Effect relationship and, to determine a sentence weight for each sentence in said document, using the weights of all eSAOs for said sentence and, if the sentence has a Cause-Effect relationship, the Cause-Effect weight for each Cause-Effect relationship in the sentence; and
- D. a summary generator configured to generate one or more weight-based document summaries as a function of said sentence weights.

24. The system of claim 23, wherein said linguistic analyzer is further configured for determining attributes for at least some of said subjects, objects, and indirect objects, wherein an attribute represents a word or phrase having a relationship to the subject, object, or indirect object for which it is an attribute.

25. The system of claim 24, wherein said relationship is one or more of a feature, inclusion, placement, formation, connection, separation, or transfer.

26. The system of claim 25, wherein said relationship is a feature of a type of parameter.

27. The system claim 23, wherein said linquistic analyzer is further configured for determining Cause-Effect relationships between said eSAOs, wherein a Cause-Effect relations recognizer uses Recognizing Linauistic Models to detect said semantic relationships between said eSAOs, and wherein said Recognizing Linguistic Models describe algorithms for detecting said Cause-Effect relationships between said eSAOs using linguistic patterns, lexemes and predefined codes or tags from a list of codes or tags.

28. The system of claim 23, wherein said weighting module is configured for performing statistical weighting, including determining said eSAO weight as a function of the frequency of appearance of components of said eSAO in said document.

29. The system of claim 28, wherein the weight of said sentence is a function of the maximum weight of each eSAO in said sentence.

30. The system of claim 23, wherein said weighting module is further configured for determining a cue weight for each sentence using cue weighting, including determining said cue weight as a function of a quantitative importance of assigned to words and phrases, wherein said sentence weights are further determined as a function of said cue weights.

31. The system of claim 30, wherein said weighting module is further configured for determining the Cause-Effect weight for each sentence using Cause-Effect weighting, including determining said Cause-Effect weight as a function of a quantitative score assigned to words and phrases having a Cause-Effect relationship.

32. The system of claim 23, wherein said weighting module is further configured for determining the Cause-Effect weight for each sentence using Cause-Effect weighting, including determining said Cause-Effect weight as a function of a quantitative score assigned to words and phrases having a Cause-Effect relationship.

33. The system of claim 23, wherein said one or more document summaries are selectable from a set of document summary types including at least one of a key-word summary, a topic-oriented summary, an eSAO summary, a classic summary, and a field-oriented summary.

34. The system of claim 23, wherein said summary generator is further configured for contracting said one or more weight-based document summaries by deleting introductory phrases and sentences as a function of a set of document patterns, wherein said document patterns identify said introductory phrases and sentences as having low relevance.

* * * * *

UNITED STATES PATENT AND TRADEMARK OFFICE
CERTIFICATE OF CORRECTION

PATENT NO. : 7,251,781 B2 Page 1 of 1
APPLICATION NO. : 10/208941
DATED : July 31, 2007
INVENTOR(S) : Leonid Batchilo et al.

It is certified that error appears in the above-identified patent and that said Letters Patent is hereby corrected as shown below:

Column 20, line 39 claim 18 delete "tbr" and insert --for--

Column 20, line 41 claim 18 insert --,-- after the second occurrence of "and"

Signed and Sealed this

Fifteenth Day of July, 2008

JON W. DUDAS
*Director of the United States Patent and Trademark Office*